United States Patent [19]

Schimpf

[11] Patent Number: 4,672,466
[45] Date of Patent: Jun. 9, 1987

[54] OPERATOR SELECTABLE MULTIPLE GRADATION SCANNER AND ENGRAVER APPARATUS AND METHOD

[75] Inventor: Daniel B. Schimpf, Charleston, Ill.

[73] Assignee: R. R. Donnelley & Sons Company, Chicago, Ill.

[21] Appl. No.: 698,451

[22] Filed: Feb. 5, 1985

[51] Int. Cl.$^4$ .......................... H04N 1/22; H04N 1/40
[52] U.S. Cl. .................... 358/299; 358/283; 358/284
[58] Field of Search ........................ 358/297, 298, 299

[56] References Cited

U.S. PATENT DOCUMENTS

| | | | |
|---|---|---|---|
| 2,813,925 | 1/1957 | Farber | 358/299 X |
| 4,245,260 | 1/1981 | Doelves | 358/299 |
| 4,422,101 | 12/1983 | Takei | 358/299 |
| 4,484,232 | 11/1984 | Gast | 358/299 |

Primary Examiner—E. A. Goldberg
Assistant Examiner—Patrick W. Foster
Attorney, Agent, or Firm—Wood, Dalton, Phillips, Mason & Rowe

[57] ABSTRACT

A system for optically scanning copy and engraving a printing plate, having a carrier for a plurality of sets of copy and a plurality of optical scanners, one for each set of copy, a scanner having an electrical signal output representing the scanned copy, a plurality of engravers one for each of said scanners, responsive to an input signal to engrave the printing plate to produce copy, an improvement wherein a circuit interconnects the output of each scanner with the input of the associated engraver, a circuit having a plurality of transfer functions, each transfer function matching a characteristic of the set of copy scanned by said scanner, and means are included for selecting for each scanner and associated engraver one of the plurality of transfer functions for said circuit.

4 Claims, 6 Drawing Figures

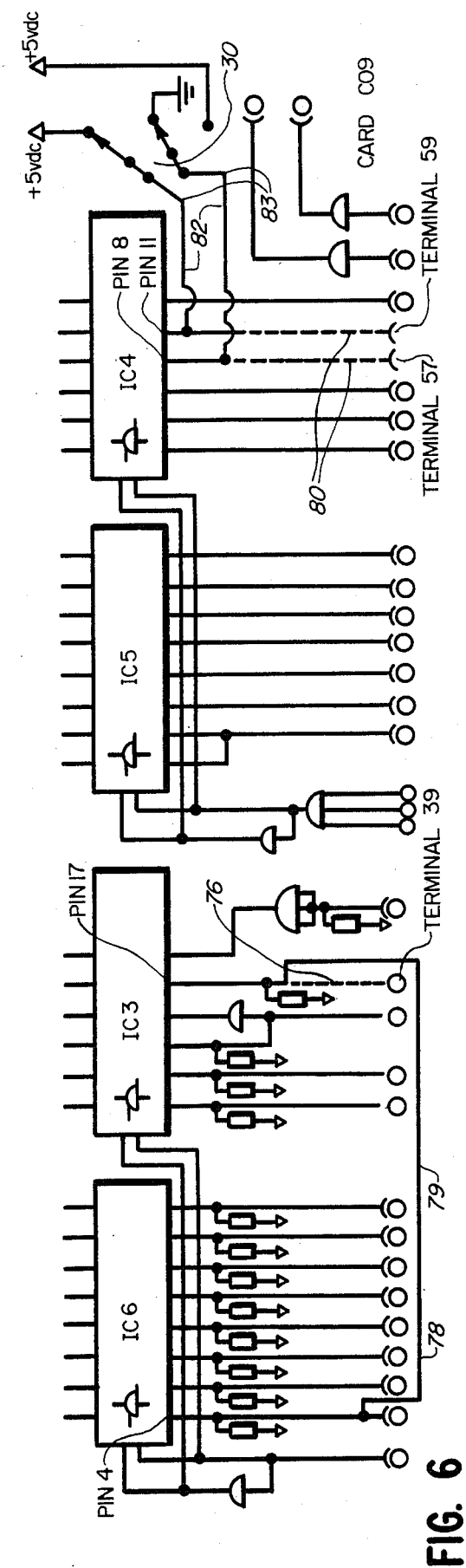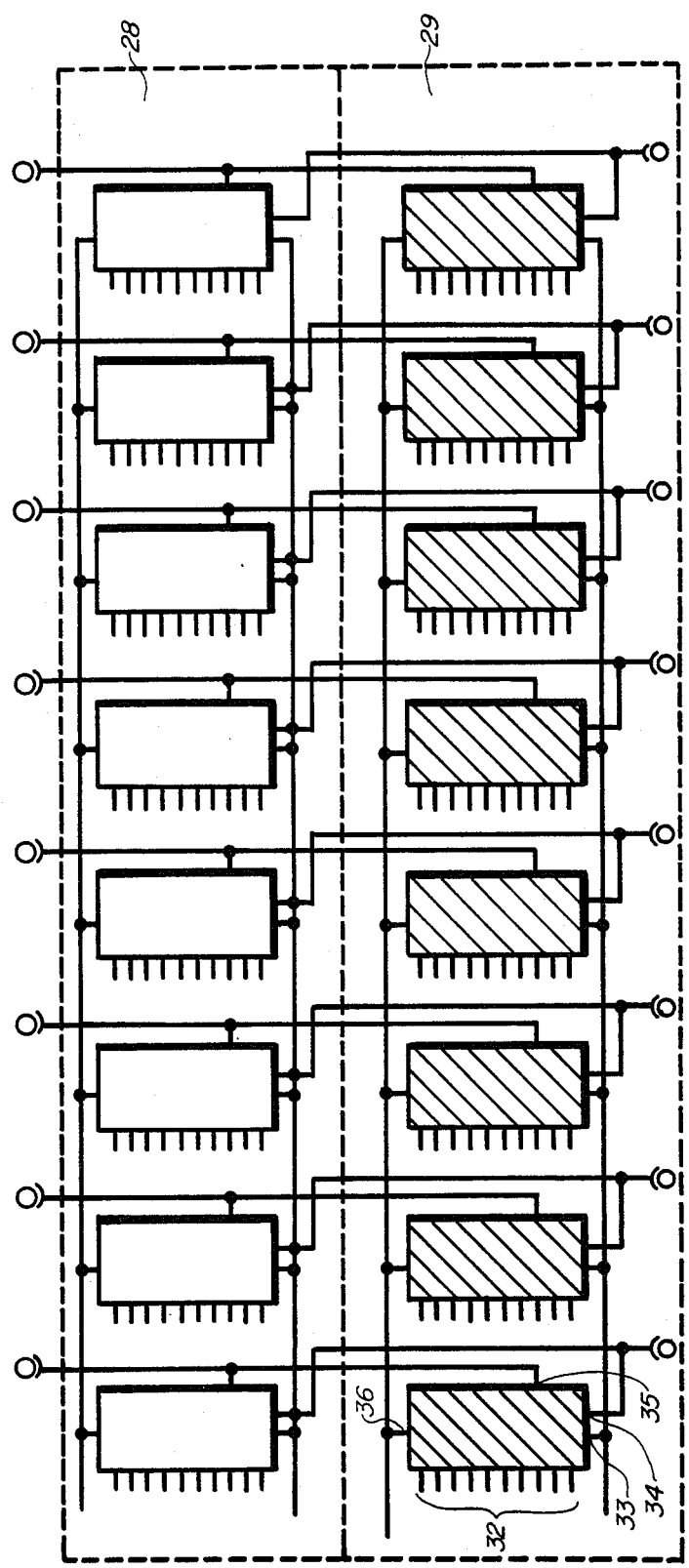
FIG. 6
FIG. 7

OPERATOR SELECTABLE MULTIPLE GRADATION SCANNER AND ENGRAVER APPARATUS AND METHOD

DESCRIPTION

1. Field of the Invention

The present invention relates to a system for optically scanning sets of copy and engraving a printing plate and more particularly to a system wherein a plurality of sets of copy, each set requiring one of a plurality of gradation curve transfer functions, are simultaneously scanned and engraved.

2. Background of the Art

In modern gravure printing plate preparation, sets of copy are circumferentially placed on a rotatable scanning drum or carrier.

The carrier rotates and an axially moving optical scanner scans the copy point by point, generating a first electrical signal representing the scanned copy.

Typically a plurality of optical scanners operate in conjunction with the carrier so that a plurality of sets of copy can be simultaneously scanned.

A separately mounted cylindrical printing plate concurrently rotates as the sets of copy are scanned by the optical scanners. Engravers move axially along the rotating printing plate and engrave into the printing plate an image of the scanned copy in response to a second electrical signal. For each optical scanner there is an associated engraver to engrave the image of the respective scanned copy into the printing plate.

Variables exist in gravure printing, depending upon such factors as the color or type of ink, the color or type of paper stock, or whether the scanned copy contains continuous tone or half tone material. Therefore, the first electrical signal cannot directly control the respective engraver. Rather, the first electrical signal must first be modified by a processor.

A signal processing unit, applying a transfer function to the first electrical signal, generates a second electrical signal. The transfer function, generally referred to as a gradation curve, correlates the second electrical signal with the first electrical signal for a specific combination of the variables. The second electrical signal controls the engravers.

While the variables of ink and paper, color and type are generally constant for a printing plate utilized on a given press run, some of the sets of copy scanned may contain continuous tone copy while others may contain half tone copy.

Previous to the present invention, when both continuous tone and half tone copy were to be scanned, a first gradation curve relating to a specified set of ink and paper conditions and to continuous tone copy is entered into the signal processing unit. The first gradation curve is electronically stored in the signal processing unit and the pages containing continuous tone copy are mounted on the carrier and scanned. The first electrical signals generated by the optical scanners are modulated by the signal processing unit in accordance with the first gradation curve. The second electrical signals are output from the signal processing unit, controlling the engravers, thereby causing the images of these sets of copy containing continuous tone copy to be engraved in the respective locations on the printing plate. Subsequently, the first gradation curve is erased and a second gradation curve relating to the same specified set of ink and paper conditions but this time to half tone copy is entered and electronically stored in the signal processing unit. The sets of copy containing half tone material are mounted on the carrier and scanned. The first electrical signals generated by the optical scanners are modulated by the signal processing unit in accordance with the second gradation curve. The second electrical signals are output from the signal processing unit, controlling the engravers, thereby causing the images of these sets of copy containing half tone copy to be engraved in the respective locations on the printing plate.

The requirement for twice engraving a printing plate, referred to as a double cut, adds substantially to the expense of printing plate preparation. In addition, the image engraved during the second scan often is not in register with the image engraved during the first scan. As the high quality nature of gravure printing does not allow a printing plate to have unregistered images, an entire remake of the printing plate is required. Finally, longer lead time for the preparation of the printing plate is necessary, thereby requiring the copy to be prepared well in advance of a press run.

SUMMARY OF THE INVENTION

In accordance with the present invention, a plurality of gradation curves are entered into a signal processing unit and electronically stored prior to the scanning.

A plurality of sets of copy are mounted on a carrier and concurrently scanned by a plurality of optical scanners. A first electrical signal is produced by each of the plurality of optical scanners and each first electrical signal is concurrently processed according to the appropriate stored gradation curve, generating a plurality of second electrical signals. Each second electrical signal is input to a respective engraver, controlling the respective engraver to etch an image of the respective scanned copy into the printing plate.

Multiple cutting of printing plates is not required because sets of copy requiring a plurality of gradation curves are concurrently scanned and engraved.

Thus, the additional labor expenses and registration problems associated with multiple cutting are eliminated and the preparation time for a printing plate is reduced.

The invention disclosed herein pertains to a Hell K-202 Helio-Klischograph, manufactured by Dr. Ing. Rudolf Hell GmbH, of the Federal Republic of Germany. The broad inventive concept comprehended by the invention is applicable to other optical scanning and engraving machines, and is in no way intended to be limited solely to the Hell K-202 Helio-Klischograph.

BRIEF DESCRIPTION OF THE DRAWINGS

Other features and advantages of the invention will be apparent from the following description taken in connection with the drawings, wherein.

Helio-Klischograph indicating a modification thereof; and,

FIG. 6 is a schematic diagram of card CO9 of the Hell GmbH K-202 Helio-Klischograph indicating modifications thereof.

DESCRIPTION OF THE PREFERRED EMBODIMENT

Figure 1:
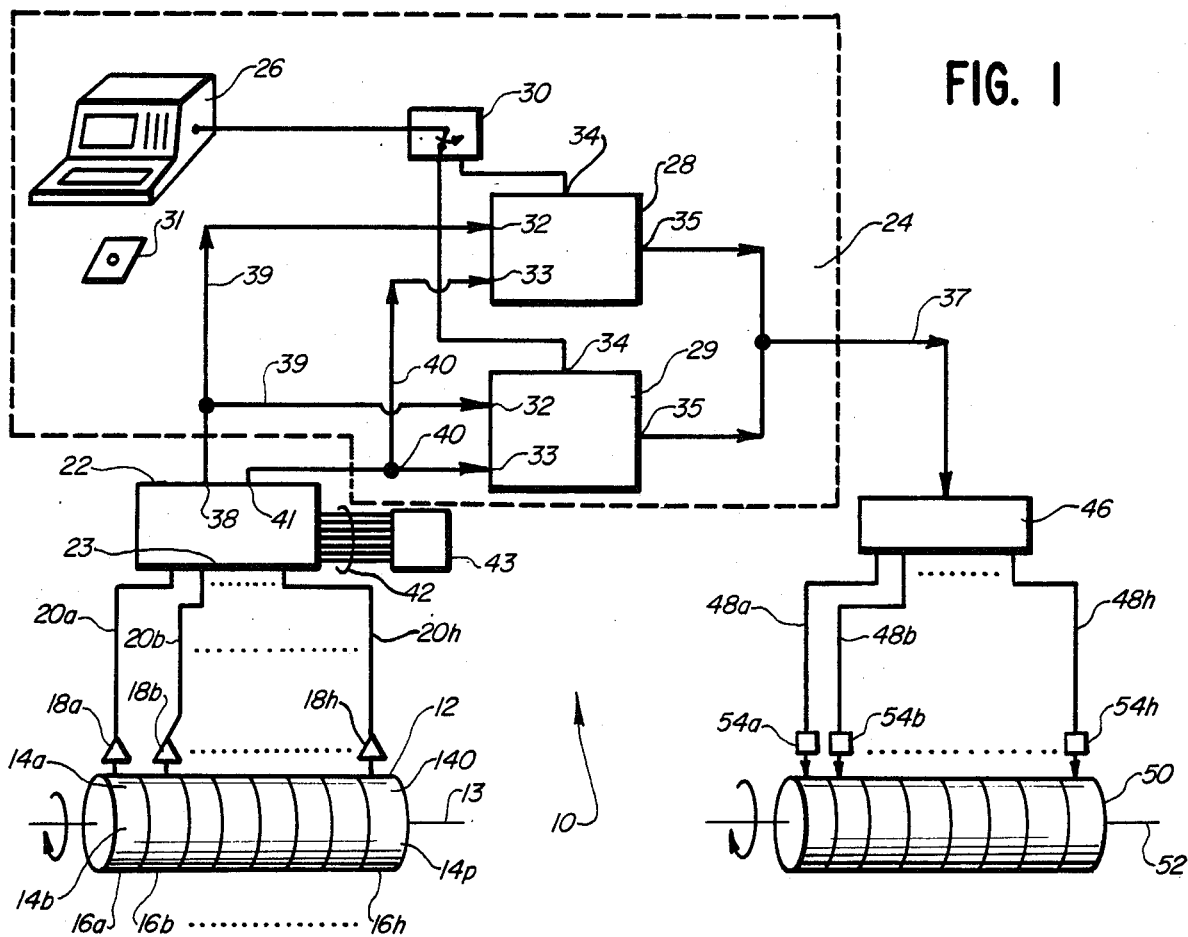
FIG. 1 is a graphic representation of a system for optically scanning sets of copy and engraving a gravure printing plate, incorporating the present invention.

Referring specifically to FIG. 1, an optical scanner and engraver 10 includes a carrier 12, rotatable about a longitudinal axis 13. Prepared copy 14 to be scanned includes sixteen separate sets of copy 14a-14p, wherein each of the sets of copy 14a-14p contain an image comprising a multitude of color densities of a final printed page. Each pair of circumferentially opposite sets of copy 14a-14p constitute a ribbon 16a-16h. The carrier 12 rotates about the longitudinal axis 13 while eight optical scanners 18a-18h move axially across the respective ribbons 16a-16h, scanning the respective sets of copy 14a-14p.

The optical scanners 18a-18h generate parallel analog optical scanner signals 20a-20h, respectively, representing the color density of the sets of copy 14a-14p. A scanner control 22 having an input 23 is connected to the optical scanners 18a-18h and receives the analog optical scanner signals 20a-20h.

A signal processing unit 24 includes a disk drive 26, first and second memories 28, 29, a first switch 30 and a magnetic storage disk 31 containing a plurality of gradation curves, discussed below. The first and second memories 28, 29 are random access memories (RAM), each having an address input 32, a chip select input 33 to enable RAM addressing, a data-in input 34, a data-out output 35 and a write-enable input 36.

The gradation curve is a transfer function correlating the optical scanner signal 20 to an engraver control signal 37, for a given set of printing variables. Two unique gradation curves are stored in the first and second memories 28, 29, respectively, and uniquely modulates the optical scanner signal 20.

The scanner control 22 has first and second scanner control outputs 38, 41. The scanner control multiplexes the parallel analog optical scanner signals 20a-20h, and digitizes the multiplexed signal producing at the first scanner control output 38 a first scanner control signal 39. The first scanner control signal 39 comprises sequential digitized samples of the parallel analog optical scanner signals 20a-20h. The first scanner control output 38, is connected to the address input 32 of the first and second memories 28,29.

The scanner control 22 also receives a gradation curve select signal 42 from a gradation curve select switch 43. The gradation curve select signal 42 comprises data indicating the memory by which each sample of the first scanner control signal should be processed.

The scanner control 22 synchronizes the gradation curve select signal 42 with the first scanner control signal 39, generating a second scanner control signal 40 at the second scanner control output 41.

The second scanner control output 41, is connected to the chip select inputs 33 of the first and second memories 28,29, selectively enabling either the first or second memory 28, 29 to respond to the first scanner control signal 39.

When the first scanner control signal 39 is input to the address input 32 of the first and second memories 28, 29 only the first or second memory 28, 29 having a simultaneous input to the chip select input 33 will generate a signal on the data-out output 35. The engraver control signal 37, a digital signal from the data-out output 35 of the selected memory is converted to analog and subsequently demultiplexed by a demultiplexer 46, synchronized with the signal processor 22. The demultiplexer 46 thereby outputs parallel analog engraving control signals 48a-48h.

A gravure printing plate 50, a metallic cylinder having a surface layer preferably of copper, is rotatable about a horizontal axis 52. Eight engravers 54a-54h, axially moveable along the gravure printing plate 50, engrave the modified images of the scanned sets of prepared copy 14a-14p in response to the engraving control signals 48a-48h, respectively.

Figure 2:
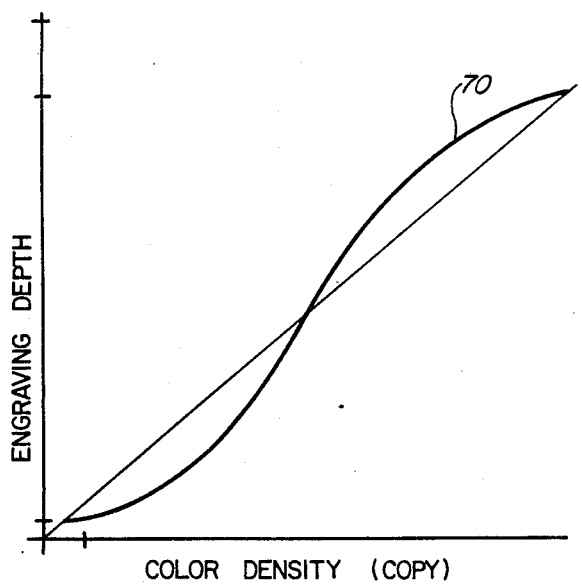
FIG. 2 is a graphic representation of a gradation curve utilized in conjunction with positive copy.

Referring to FIG. 2, illustrated is a typical positive copy gradation curve 70. The positive copy gradation curve 70 correlates the color density of positive copy scanned to the required engraving depth of the gravure printing plate 50. As illustrated, the relationship is nonlinear. At the low end of the positive copy gradation curve 70, indicating substantially no color density of the prepared copy 14, some engraving of the gravure printing plate 50 is still required. At the high end of the positive copy gradation curve 70, indicating substantially black copy, the engraving depth of the gravure printing plate 50 remains substantially constant. The specific shape of the positive copy gradation curve 70 varies depending upon the printing variables, such as color or type of ink or paper stock to be used or whether the copy contains half tone or continuous tone material. Specifically, for a given copy density, the engraving depth required of the gravure printing plate 50 varies with the above variables.

Figure 3:
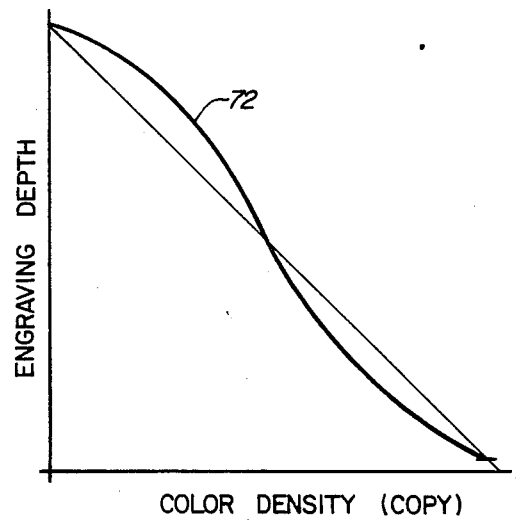
FIG. 3 is a graphic representation of a gradation curve utilized in conjunction with negative copy.

FIG. 3 illustrates a typical negative copy gradation curve 72. The negative copy gradation curve 72 is a mirror image of the positive copy gradation curve 70 (FIG. 2). The shape of the negative copy gradation curve 72, also nonlinear, similarly varies depending upon the variables of the press run.

Figures 4, 5:
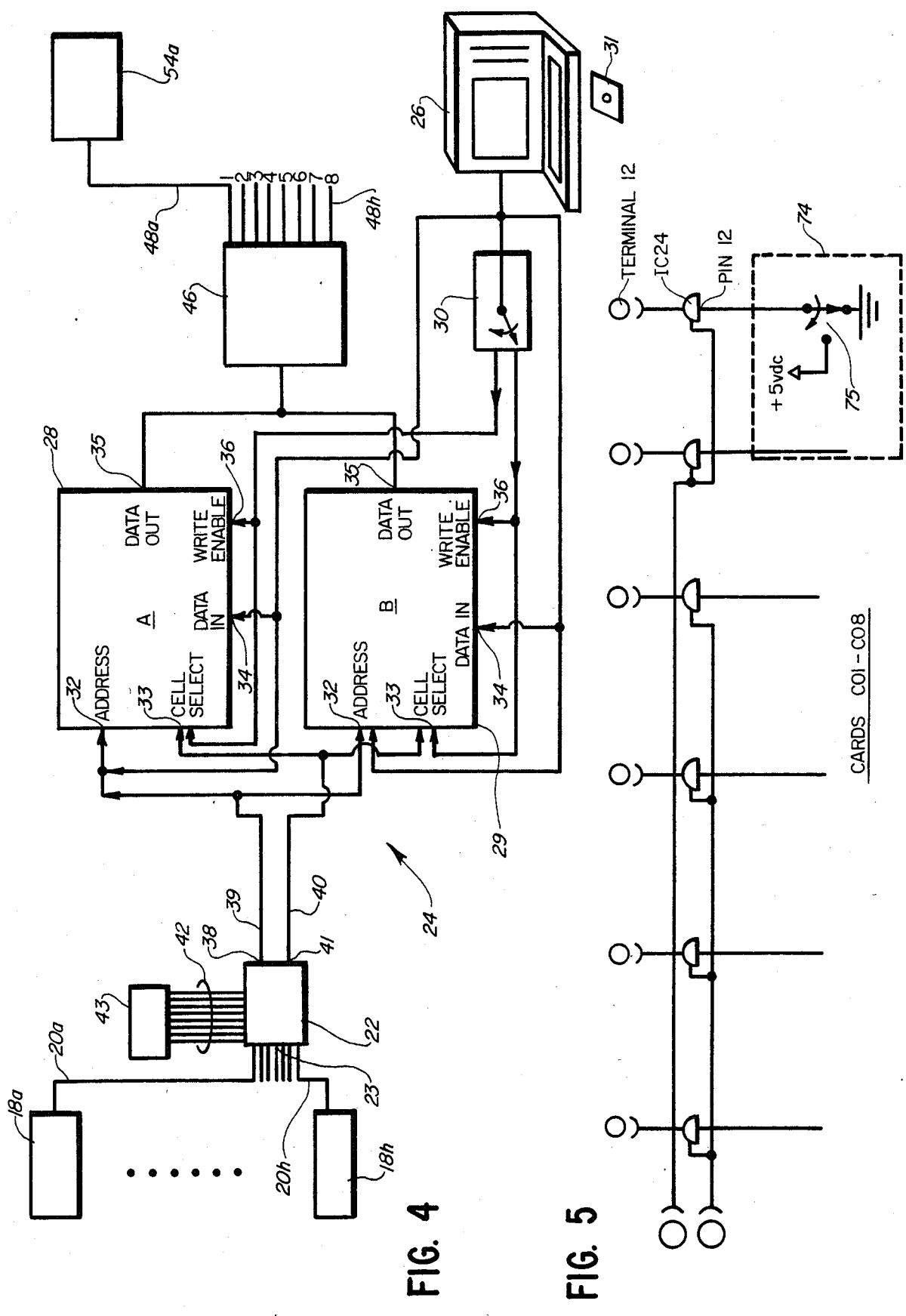
FIG. 4 is a graphic representation of a signal processing unit.
FIG. 5 is a partial schematic diagram of cards CO1 through CO8 of the Dr. Ing. Rudolf Hell GmbH K-202

Referring to FIG. 4, illustrated is the signal processing unit 24. The signal processing unit 24 first reads gradation curve data previously stored on the magnetic storage disk 31 and selectively writes the gradation curve data into either the first memory 28 or the second memory 29 by way of the data-in input 34.

Second, the signal processing unit 24 takes the digital multiplexed samples from each of the optical scanner signals 20a-20h and sequentially addresses the samples to the address input 32 and chip select input 33 of the first and second memories 28, 29. At the data-out output 35 of the selected memory, the engraver control signal 37 which corresponds to the optical scanner signal 20 modified by the stored gradation curve, is produced.

Specifically, the magnetic storage disk 31 contains a plurality of preprogrammed gradation curves, each gradation curve representing the correlation between the color density of the prepared copy 14 (FIG. 1) and the engraving depth required for the specified set of printing variables.

The proper gradation curve is initially selected and the switch 30 is positioned to enable the chip select input 33 and the write enable input 36 of the first memory 28 into which the first gradation curve is to be written. The gradation is read by the disk drive 26 and simultaneously written in the data-in input 34 of the first memory 28.

Subsequently the first switch 30 is positioned to enable the chip select input 33 and write enable input 36 of the second memory 29, and a second gradation curve is chosen, read by the disk drive 26 from the magnetic storage disk 31 and written in the data-in input 34 of the second memory 29.

The first scanner control signal 39 of the scanner control 22 comprises multiplexed samples of the optical scanner signals 20a–20h from the optical scanners 18a–18h. The second scanner control signal 40 comprises multiplexed samples from the gradation curve select switch 43. The second scanner control output signal 40 is synchronized with the first scanner control signal 39 such that as the first scanner control signal 39 representing data from the first optical scanner 18a is output, the second scanner control signal 40 representing data from the gradation curve select switch 43 is simultaneously output.

Therefore, as digital multiplexed samples of the optical scanner signals 20 are output from the scanner control 22, the proper first or second memory 28, 29 is selected. At the data-out output 35 of the selected first or second memory 28, 29 is output the engraver control signal 37 which is converted to analog and demultiplexed by the demultiplexer 46. Output from the demultiplexer 46 are the engraver control signals 48a–48h, which in turn are input to the respective engravers 54a–54h. Thus, the position of the gradation curve select switch 43 determines which stored gradation curve modifies the data from each particular optical scanning head.

FIGS. 5, 6 and 7 illustrate modifications to printed circuit cards CO1, CO2, CO3, CO4, CO5, CO6, CO7, CO8, and CO9, respectively, of the Hell K-202 Helio-Klischograph to provide the multiple gradation performance of this invention.

Cards CO1-CO8 are identical, each card receiving information from one of the optical scanner 18a–18h.

Referring to FIG. 5, the existing cards CO1-CO8, each include a pin 12 of an integrated circuit chip 24 (IC24) directly connected to a ground reference. A first modification 74 comprises the removal of the direct connection to the ground and the addition of a switch 75 to allow for the selection of a +5 VDC or ground input to the pin 12 of IC24 of printed circuit card CO1-- CO8. The eight switches so added collectively comprise the gradation curve select switch 43.

A ground input to pin 12 selects the memory chips comprising the first memory 28. A +5 VDC input to pin 12 selects the memory chips comprising the second memory 29.

Referring to FIG. 6, a pin 17 of IC3 on a printed circuit card CO9 is connected to a terminal 39 of the printed circuit card CO9 prior to any modification. A second modification 76 comprises the removal of the connection between the pin 17 of IC3 and the terminal 39 of the printed circuit card CO9. A third modification 78 comprises adding a first connection 79 from the pin 17 of IC3 to a pin 4 of IC6 on the printed circuit card CO9.

The second and third modifications insure that the input to pins 2 of tne IC chips comprising the first memory 28 is equal to the input to pins 2 of the IC chips comprising the second memory 29.

Pins 8 and 11 of IC4 of printed circuit card CO9 are connected to terminal 57 and 49 respectively of card CO9. A fourth modification 80 comprises the removal of the aforementioned connections. A fifth modification 82 comprises adding a second connection 83 from the pins 8 and 11 of IC4 to a double pole, double throw (DPDT) switch 84 such that pin 8 is connnected to a +5 VCD source when pin 11 is at ground and vice versa.

The position of DPDT switch 84 determines to which memory, 28 or 29, the gradation curve data will be stored. The DPDT switch 84 is illustrated generally as the switch 30 in FIGS. 1 and 4.

Referring to FIG. 7, a sixth modification 86 comprises the connection of eight additional RAM integrated circuits, identical to the existing eight RAM integrated circuits (IC21, IC22, IC23, IC24, IC25, IC26, IC35 and IC36.)

The existing integrated circuit memory chips are illustrated as the first memory 28. The additioinal integrated circuit memory chips are indicated shaded as the second memory 29. The inputs and output of a single integrated circuit memory chip 88 are labeled, and are the same for the other integrated circuit memory chips comprising the first and second memories 28, 29.

Specific connections as indicated on the drawing, can be made by one reasonably skilled in the art.

The above invention, applicable specifically to the Hell GmbH K-202 Helio-Klischograph and generally to any optical scanning and engraving device, greatly reduces the expense and time required to engrave a gravure printing plate. Sets of copy requiring a plurality of gradation curves may be concurrently mounted and scanned and a gravure printing plate engraved, eliminating the requirement for a plurality of scanning and engraving operations.

I claim:

1. A method of modifying an optical scanner and engraver for optically scanning copy and engraving a printing plate such that a plurality of sets of copy, at least one of which requires one gradation curve transfer function and at least another one of which requires another gradation curve transfer function, can be simultaneously scanned and a printing plate engraved, the optical scanner and engraver having a carrier for a plurality of sets of copy, a plurality of optical scanners, one for each set of copy, each scanner producing an electrical signal output representing the scanned copy, a plurality of engravers, one for each of the scanners, each responsive to an input signal to engrave the printing plate to reproduce one set of scanned copy, a storage device for storing a plurality of gradation curve transfer functions and, a signal processing unit coupled to the optical scanners, the engravers and the storage device and having a random access memory first location for storing a first gradation curve transfer function received from the storage device wherein the signal processing unit converts each scanner electrical signal output to a corresponding engraver input signal in accordance with the first gradation curve transfer function, the method comprising:

providing means for storing in a random access memory second location a second gradation curve transfer function received from the storage device, providing a first switch for selectively directing the gradation curve transfer function received from the storage device for storage alternatively either in the first or the second random access memory locations, providing a plurality of switches, one for each set of scanners and engravers, for directing the signal processing unit to individually convert each scanner electrical signal output to its corresponding engraver signal input in accordance selectively with either the first or the second gradation curve transfer function.

2. A method for modifying a K-202 Helio-Klischograph optical scanner and engraver manufactured by Dr. Ing Rudolf Hell GmbH for optically scanning copy and engraving a printing plate, such that a plurality of sets of copy can be simultaneously scanned and a printing plate engraved, the optical scanner and engraver having a carrier for a plurality of sets of copy, a plurality of optical scanners, one for each set of copy, each scanner producing an electrical signal output representing the scanned copy, a plurality of engravers, one for each of the scanners, each responsive to an input signal to engrave the printing plate to reproduce one set of scanned copy, a storage device for storing a plurality of gradation curve transfer functions, a signal processing unit coupled to the optical scanners, the engravers and the storage device and having a first memory comprising an independently selectible first random access memory semiconductor chip for each pair of scanners and engravers, the first random access memory for storing a first gradation curve transfer function received from the storage device and which is addressable by each of the electrical signal outputs, a first set of printed circuit cards CO1–CO8, each of which directs one of the electrical signal outputs to address inputs of the first semiconductor memory, and an additional printed circuit card CO9 which directs a gradation curve transfer function received from the storage device to the first semiconductor memory for storage, whereby the signal processing unit converts each of the electrical signal inputs to their respective output signals in accordance with the first gradation curve transfer function, the method comprising:

providing for the signal processing unit a second random access memory comprising a second random access memory semiconductor chip for each set of scanners and engravers, the second random access memory storing a second gradation curve transfer function received from the storage device, removing a connection between a pin 8 of an integrated circuit chip 4 of the printed circuit card CO9 and a terminal 57 of the printed circuit card CO9 and removing a connection between a pin 11 of an integrated circuit chip 4 of the printed circuit card CO9 and a terminal 59 of the printed circuit card CO9 and providing first means for switching a voltage applied to a pin 8 and to a pin 11 of the integrated circuit chip 4 of the printed circuit card CO9 alternatively between a logical high and a logical low value such that the first switching means directs the particular gradation curve transfer function received from the storage device alternatively for storage either in the first or the second semiconductor memory, removing a connection between a pin 17 of an integrated circuit chip 3 of the printed circuit card CO9 and a terminal 39 of the printed circuit card CO9 and providing a connection between the pin 17 and a pin 4 of an integrated circuit chip 6 of the printed circuit card CO9 such that the electrical signal output received by the first and second semiconductor memories are the same; and providing second means for switching a voltage applied to a pin 12 of an integrated circuit chip 24 between a logical high value and a logical low value on each of the printed circuit cards CO1–CO8, the second switching means selecting alternatively either the first or the second random access memory semiconductor chip for each scanner and engraver set to convert each scanner electrical signal output to its corresponding engraver signal input in accordance with either the first or the second gradation curve transfer function.

3. An improvement to an optical scanner and engraver for optically scanning copy and engraving a printing plate such that a plurality of sets of copy, at least one of which requires one gradation curve transfer function and at least another of which requires another gradation curve transfer function can be simultaneously scanned and the printing plate engraved, the optical scanner and engraver having a carrier for a plurality of sets of copy, a plurality of optical scanners, one for each set of copy, each scanner producing an electrical signal output representing the scanned copy, a plurality of engravers, one for each of the scanners, each responsive to an input signal to engrave the printing plate to reproduce one set of scanned copy, a storage device for storing a plurality of gradation curve transfer functions and, a signal processing unit coupled to the optical scanners, the engravers and the storage device and having a random access memory first location for storing a first gradation curve transfer function received from the storage device wherein the signal processing unit converts each scanner electrical signal output to a corresponding engraver input signal in accordance with the first gradation curve transfer function, the improvement comprising:

means for storing in a random access memory second location a second gradation curve transfer function received from the storage device, a first switch for selectively directing the gradation curve transfer function received from the storage device for storage alternatively either in the first or the second random access memory locations, a plurality of switches, one for each set of scanners and engravers, for directing the signal processing unit to convert each scanner electrical signal output to its corresponding engraver signal input in accordance selectively with either the first or the second gradation curve transfer function.

4. An improvement to a K-202 Helio-Klischograph optical scanner and engraver manufactured by Dr. Ing. Rudolph Hell GmbH for optically scanning copy and engraving a printing plate such that a plurality of sets of copy, at least one of which requires one gradation curve transfer function and at least another of which requires another gradation curve transfer function, can be simultaneously scanned and the printing plate engraved, having
- a carrier for a plurality of sets of copy.
- a plurality of optical scanners, one for each set of copy, each scanner producing an electrical signal output representing the scanned copy,
- a plurality of engravers, one for each of the scanners, each responsive to an input signal to engrave the printing plate to reproduce one set of scanned copy,
- a storage device for storing a plurality of gradation curve transfer functions,
- a signal processing unit coupled to the optical scanners, the engravers and the storage device and having
- a first memory comprising an independently selectible first random access memory semiconductor chip for each pair of scanners and engravers, the first random access memory for storing a first gradation curve transfer function received from the storage device and which is addressable by each of the electrical signal outputs,
- a first set of printed circuit cards CO1-CO8, each of which directs on of the electrical signal outputs to address inputs of the first semiconductor memory, and
- an additional printed circuit card CO9 which directs a gradation curve transfer function received from the storage device to the first semiconductor memory for storage, whereby the signal processing unit converts each of the electrical signal inputs to their respective output signals in accordance with the first gradation curve transfer function, the improvement comprising:
- a second random access memory comprising a second random access memory semiconductor chip for each set of scanners and engravers, the second random access memory storing a second gradation curve transfer function received from the disk storage device,
- an open circuit between a pin 8 of an integrated circuit chip 4 of the printed circuit card CO9 and a terminal 57 of the printed circuit card CO9 and an ooen circuit between a pin 11 of an integrated circuit chip 4 of the printed circuit card CO9 and a terminal 59 of the printed circuit card CO9 and first means for switching a voltage applied to a pin 8 and to a pin 11 of the integrated circuit chip 4 of the printed circuit card CO9 alternatively between a logical high and a logical low value such that the first switching means directs the particular gradation curve transfer function received from the disk drive alternatively for storage either in the first or the second semiconductor memory,
- an open circuit between a pin 17 of an integrated circuit chip 3 of the printed circuit card CO9 and a terminal 39 of the printed circuit card CO9 and closed circuit between the pin 17 and a pin 4 of an integrated circuit chip 6 of the printed circuit card CO9 such that the electrical signal output received by the first and second semiconductor memories are the same; and
- second means for switching a voltage applied to a pin 12 of an integrated circuit chip 24 between a logical high value and a logical low value on each of the printed circuit cards CO1-CO8, the second switching means selecting alternatively either the first or the second random access memory semiconductor chip for each scanner and engraver set to convert each scanner electrical signal output to its corresponding engraver signal input in accordance with either the first or the second gradation curve transfer function.

* * * * *